(12) United States Patent
Lambert

(10) Patent No.: US 10,681,038 B1
(45) Date of Patent: Jun. 9, 2020

(54) SYSTEMS AND METHODS FOR EFFICIENT PASSWORD BASED PUBLIC KEY AUTHENTICATION

(71) Applicant: Marvell International Ltd., Hamilton (BM)

(72) Inventor: Paul A. Lambert, Mountain View, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 282 days.

(21) Appl. No.: 15/794,916

(22) Filed: Oct. 26, 2017

Related U.S. Application Data

(60) Provisional application No. 62/412,926, filed on Oct. 26, 2016.

(51) Int. Cl.
| | | |
|---|---|---|
| *H04L 29/06* | (2006.01) | |
| *H04L 9/08* | (2006.01) | |
| *H04L 9/16* | (2006.01) | |
| *H04L 9/32* | (2006.01) | |

(52) U.S. Cl.
CPC .......... *H04L 63/083* (2013.01); *H04L 9/0844* (2013.01); *H04L 9/0866* (2013.01); *H04L 9/0869* (2013.01); *H04L 9/16* (2013.01); *H04L 9/3226* (2013.01); *H04L 63/0435* (2013.01); *H04L 63/06* (2013.01)

(58) Field of Classification Search
CPC ... H04L 63/083; H04L 63/0435; H04L 63/06; H04L 9/0844; H04L 9/0866; H04L 9/0869; H04L 9/16; H04L 9/3226
See application file for complete search history.

(56) References Cited

U.S. PATENT DOCUMENTS

| | | | | |
|---|---|---|---|---|
| 10,389,533 | B2 * | 8/2019 | Le Saint | H04L 9/0891 |
| 2015/0372811 | A1 * | 12/2015 | Le Saint | H04L 9/0841 705/76 |
| 2016/0277179 | A1 * | 9/2016 | Tunstall | G09C 1/00 |
| 2017/0104745 | A1 * | 4/2017 | Camenisch | H04L 63/083 |
| 2018/0167208 | A1 * | 6/2018 | Le Saint | H04L 9/0844 |

* cited by examiner

*Primary Examiner* — Hee K Song

(57) ABSTRACT

In a method for efficient password based public key authentication between a first user device and a second user device, a shared password is received by a first user device which generates a first hash value of the shared password and a first value, wherein the first value is composed of at least a product of the first hash value and a first unique security constant associated with the first user. The first user device then generates a first random value generated using data from a generator element, and a first blind public key associated with the first user device, wherein the first blind public key is generated using a first public key. The first user device concurrently sends the first value and the first blind public key to the second user device for authentication.

20 Claims, 4 Drawing Sheets

SYSTEMS AND METHODS FOR EFFICIENT PASSWORD BASED PUBLIC KEY AUTHENTICATION

CROSS REFERENCE RELATED APPLICATION

This application claims the benefit under 35 U.S.C. § 119(e) of U.S. Provisional Application No. 62/412,926, filed on Oct. 26, 2016 which is hereby incorporated by reference herein in its entirety.

FIELD OF USE

This disclosure is generally directed to improving the process of authentication of devices using password based public key authentication.

BACKGROUND OF DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

There are two kinds of authentication methods. The first method is a password based method, where any user device having a shared password may connect with any other device also having the same shared password. There are no long term public keys in this method and there is no way to identify the devices that are involved in the connection. This makes the connection insecure.

The second method, the mutually blinded Diffie Hellman method allows for sharing of an encrypted public key between users to verify identities before transmission of data. However, in this method, a first user device has to have access to a public key of a second user device in order to decrypt a message received from the second user device to verify the identity of the second user. In this method, a first device cannot connect with devices that the first device has not interacted with previously.

SUMMARY

In view of the foregoing, systems and methods are provided for efficient password based public key authentication between a first user device and a second user device.

According to one aspect of the disclosure, a shared password is received by a first user device. A first hash value of the password is generated by the first user device. A first value is generated at the first user device, wherein the first value is composed of at least a product of the first hash value and a first unique security constant associated with the first user and a first random value generated using data from a generator element. A first blind public key is generated at the first user device, a first blind public key associated with the first user device, wherein the first blind public key is generated using a first public key, and concurrently sending the first value and the first blind public key to the second user device for authentication.

In some embodiments, the shared password is received by the second user device. The second user device generates a second hash value of the shared password and generates a second value, wherein the second value is composed of at least a product of the second hash value and a second unique security constant associated with the second user, and a second random value generated using data from the generator element. The second user device generates a second blind public key associated with the second user device, wherein the second blind public key is generated using a second public key.

In some embodiments, the second user device generates a first shared key, wherein the first shared key is generated using the first blind public key, the first value, the first unique security constant, the second hash value and a first plurality of random values.

In some embodiments, the second user device generates, a first symmetric key, wherein the first symmetric key is generated using the first value, the second value, and the second hash value, and encrypts, using the first symmetric key, a first message wherein the message comprises at least the second public key and a random value used to blind the second public key.

In some embodiments, the second value, the second blind public key, and the first message are concurrently sent to the first user device.

In some embodiments, the first user device receives the second value, the second blind public key, the, and the first message. The first user device generates a second shared key at the first user device, wherein the second shared key is generated using the second blind public key, the second value, the second unique security constant, the first hash value, and a second plurality of random values. The first user device generates a first decryption key using the first value, the second value, the first hash value, and the third shared key, wherein the first decryption key is same as the first symmetric key generated at the second user device.

In some embodiments, the first user device decrypts, using the first decryption key, the first message to reveal the first random value and the second public key. The first user device combines the first random value and the second public key to generate a blind public key, and compares the generated blind public key and the received second blind public key to verify the identity of a second user.

In some embodiments, the first user device generates a second symmetric key, wherein the second symmetric key is generated using the second value, the first value, and the first hash value. The first device encrypts using the second symmetric key, a second message, wherein the second message at least includes the first public key and a second random value used to blind the first public key, and sends the second message to the second user device.

In some embodiments, the second user device receives the second message. The second user device generates a second decryption key at the second user device using the first value, the second value, the second hash value, and the first shared key, wherein the second decryption key is same as the second symmetric key generated at the first user device. The second user device decrypts using the second decryption key, the second message to reveal the second random value and the first public key. The second user device combines the second random value and the first public key to generate a blind public key, and compares the generated blind public key and the received first blind public key to verify the identity of the first user device.

In some embodiments, the second user device sends an acknowledgement to the first user device, wherein the acknowledgement includes the second shared key.

BRIEF DESCRIPTION OF DRAWINGS

Further features of the disclosure, its nature and various advantages will be apparent upon consideration of the following detailed description, taken in conjunction with the accompanying drawings, in which.

DETAILED DESCRIPTION

To provide an overall understanding of the disclosure, certain illustrative embodiments will now be described in connection with systems and methods for password based public key authentication. However, the systems and methods described herein may be adapted and modified as appropriate for the application being addressed and the systems and methods described herein may be employed in other suitable applications, and that such other additions and modifications will not depart from the scope thereof.

Figure 1:
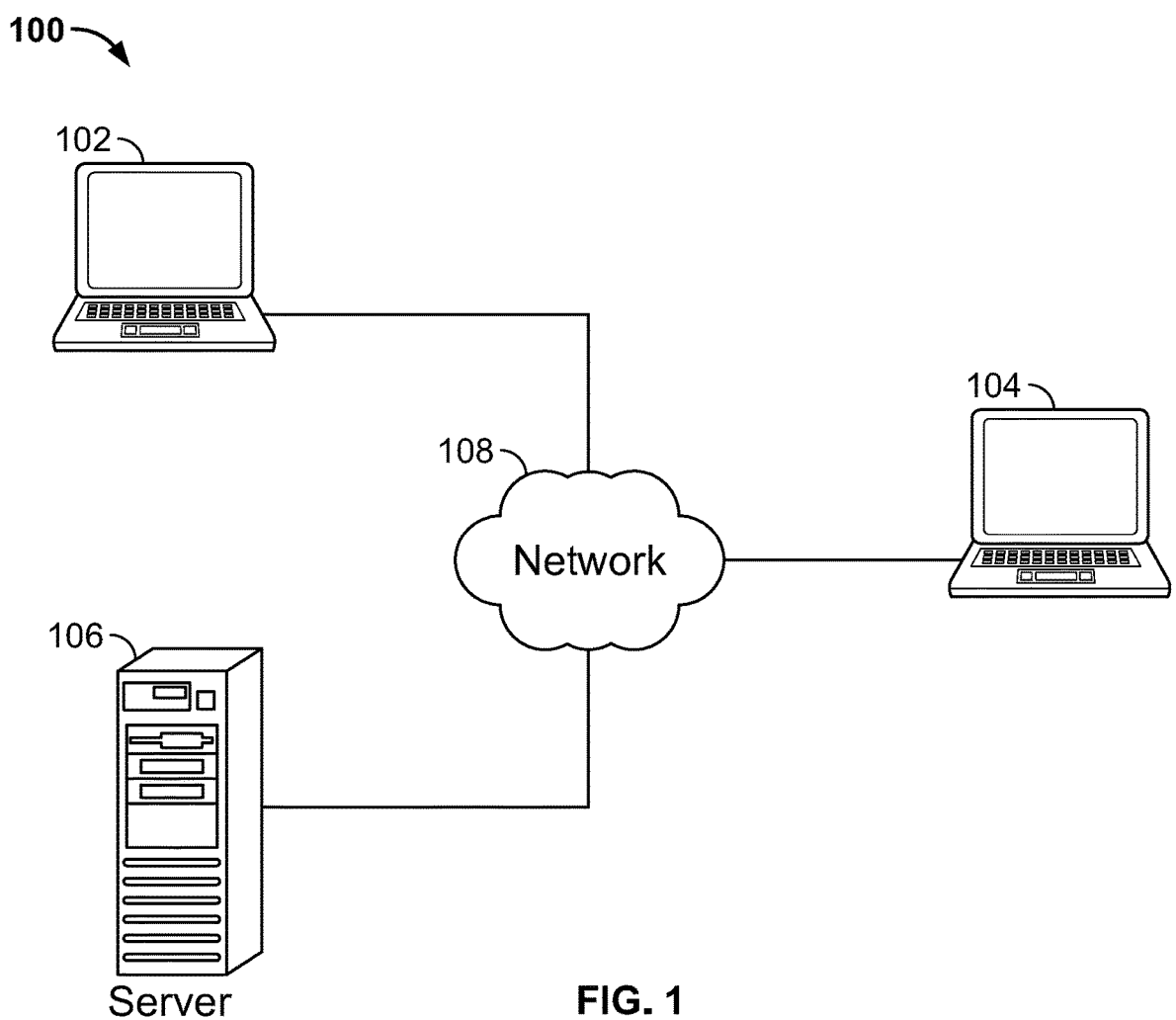
FIG. 1 shows a schematic diagram of an illustrative system in which two user devices communicate over a network, in accordance with an embodiment of the present disclosure.

FIG. 1 shows a schematic diagram of an illustrative system in which two user devices communicate over a network, in accordance with an embodiment of the present disclosure System 100 in FIG. 1 includes a first user device 102, a second user device 104, a server 106, and network 108. First user device 102, second user device 104, and server 106 may be connected to each other over network 108.

In some embodiments, first user device 102 includes one or more various circuitries such as control circuitry, encoding circuitry, decoding circuitry, transmission circuitry, receiving circuitry, memory circuitry, processing circuitry and integrated circuitry that may combine the various circuitries together. The functions discussed in this disclosure with respect to first user device 102 may be performed by control circuitry or any combination of the other circuitries that form part of first user device 102. In some embodiments, second user device 104 includes one or more various circuitries such as control circuitry, encoding circuitry, decoding circuitry, transmission circuitry, receiving circuitry, memory circuitry, processing circuitry and integrated circuitry that may combine the various circuitries together. The functions discussed in this disclosure with respect to second user device 104 may be performed by control circuitry or any combination of the other circuitries that form part of second user device 104. In some embodiments, server 106 includes one or more various circuitries such as control circuitry, encoding circuitry, decoding circuitry, transmission circuitry, receiving circuitry, memory circuitry, processing circuitry and integrated circuitry that may combine the various circuitries together. The functions discussed in this disclosure with respect to server 106 may be performed by control circuitry or any combination of the other circuitries that form part of server 106.

In some embodiments, communications between first user device 102 and second user device 104 may be routed through server 106 over network 108. In some embodiments, server 106, may provide a shared password to both first user device 102 and second user device 104 to connect to network 108. The first user device 102 and the second user device 104 may communicate with each other over network 108, after the identity of the first user device 102 and the second user device 104 has been verified by each other. The process of verifying the identity of the first user 102 and the second user 104 is described in more detail with respect to FIG. 2.

Figure 2:
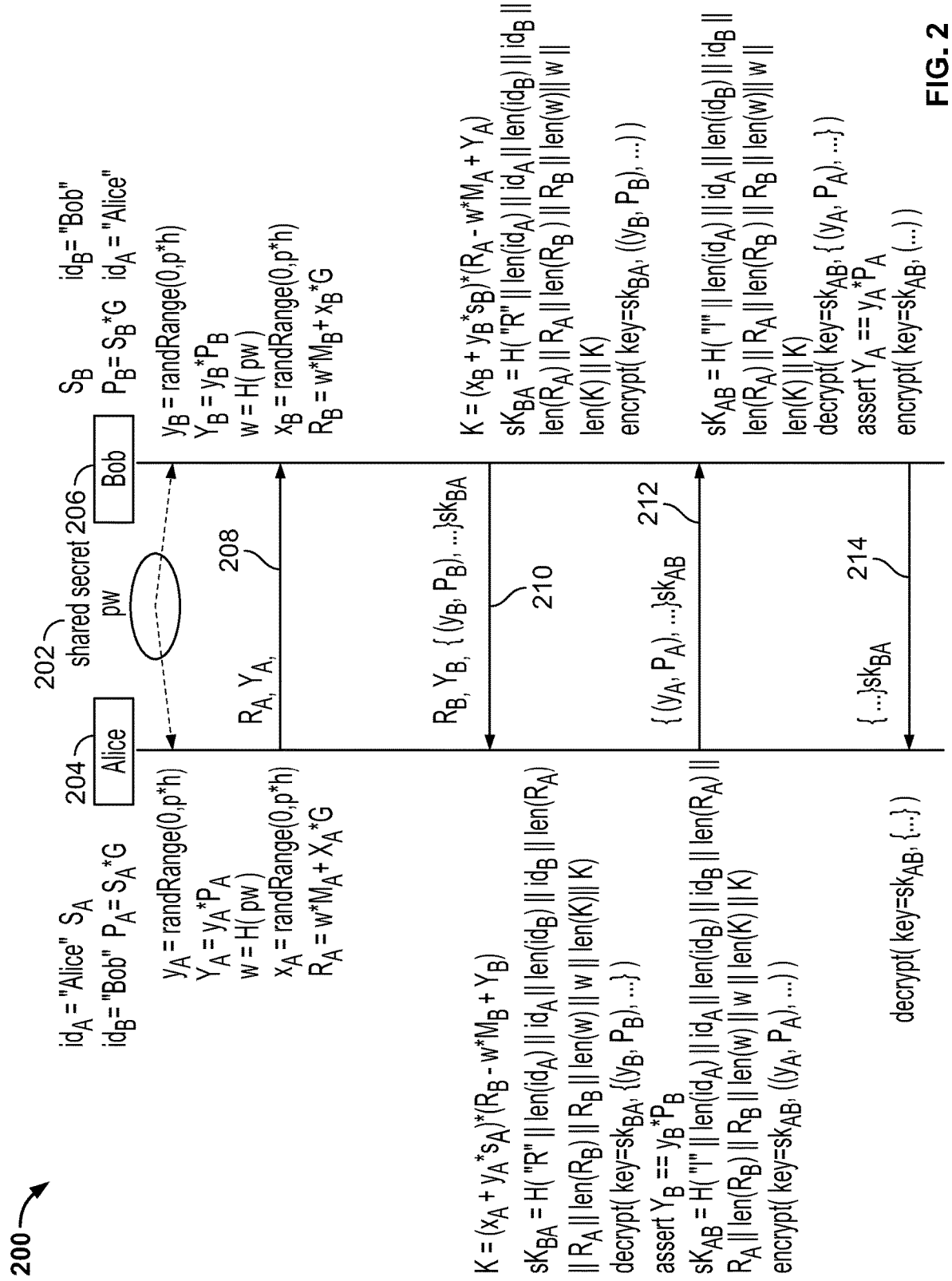
FIG. 2 shows a communication diagram of an illustrative system that verifies an identity of a first user and a second user, in accordance with an embodiment of the present disclosure.

FIG. 2 shows a communication diagram of an illustrative system that verifies an identity of a first user and a second user, in accordance with an embodiment of the present disclosure. System 200 in FIG. 2 contains the first user device 102 and a second user device 104. Communication diagram 200 starts when both first user device 102 and second user device 104 receive a shared password 202. In some embodiments, the shared password received may be provided by server 106. In some embodiments, the shared password 202 may be the password used to log in to server 106 to connect over network 108.

First user device 102 generates a hash value (w) of the password using a first hash function. First user device 104 generates a hidden version of the password using the following formula:

$$R_A = w^* M_A + x_A^* G \quad (1)$$

where $M_A$ is a security constant unique to first user device 102, $x_A$ is a random integer between 0 and a product of a prime number associated with an elliptic curve and a cofactor group, and G is a generator element used for public key operations.

First user device 102 also calculates a blind version of a public key ($Y_A$) associated with the first user device 102 by multiplying a public key ($P_A$) associated with first user device 102 with a random value between 0 and a product of a prime number associated with an elliptic curve and a cofactor group ($y_A$). At 208, first user device 102 sends to the second user device 104, the hidden value of the shared password $R_A$ and the blind public key $Y_A$ at the same time.

Second user device 104 also generates a hash value (w) of the password using a second hash function. In some embodiments, the first hash function may be same as the second hash function. Second user device 104 generates a hidden version of the password using the following formula:

$$R_B = w^* M_B + x_B^* G \quad (2)$$

where $M_B$ is a security constant unique to second user device 104, $x_B$ is a random integer between 0 and a product of a prime number associated with an elliptic curve and a cofactor group, and G is a generator element used for public key operations.

Second user device 104 also calculates a blind version of a public key ($Y_B$) associated with second user device 104 by multiplying a public key ($P_B$) associated with second user device 104 with a random value between 0 and a product of a prime number associated with an elliptic curve and a cofactor group ($Y_B$).

Additionally, second user device 104, generates a first shared key K1 using the following formula:

$$K1 = (x_B + y_B^* s_B)^* (R_A - w^* M_A + Y_A) \quad (3)$$

where "+" indicates an associative group operation and "*" indicates a scalar multiplication. Like $x_B$, $y_B$ is also a random integer generated from a set of random integers of the same range as $x_B$. $s_B$ is a private key of the second user device 104.

Using the shared key (K) generated in (3), second user device 104 generates a first pairwise symmetric key $sk_{BA}$ using the following formula:

$$sk_{BA}=H(\text{``}R\text{''}\|len(id_A)\|id_A\|len(id_B)\|id_B\|len(R_A)\|R_A\|len(R_B)\|R_B\|len(w)\|w\|len(K1)\|K1) \quad (4)$$

where H( ) is the second hash function, len( ) is a function that determines the length of its arguments, ‖ is a concatenation operation, $id_A$ is an identifier of first user device 102 and $id_B$ is an identifier of second user device 104. $R_A$ is generated at the first user device using (1) as described above and received from first user device 102. $R_B$ is generated using (2) at second user device 104. w is a hash calculated hash value of the password at the second user device 104.

Second user device 104 uses the first pairwise symmetric key $sk_{BA}$ to encrypt a first message that includes the public key ($P_B$) of the second user device 104 and the random value ($y_B$) used to generate the second blind public key ($Y_B$) of the second user device 104. In some embodiments, additional values may also be encrypted in the first encrypted message along with $P_B$ and $y_B$ using the first pairwise symmetric key $sk_{BA}$. At 210, second user device 104 sends the generated $R_B$, $Y_B$, and the first encrypted message to the first user device 102.

First user device 102, receives $R_B$, $Y_B$, and the first encrypted message. First user device 102 generates a second shared key K2 using the following formula:

$$K2=(x_A+y_A{}^*s_A)^*(R_B-w^*M_B+Y_B) \quad (5)$$

Like $x_A$, $y_A$ is also a random integer generated from a set of random integers of the same range as $x_A$. $s_A$ is a private key of the first user device 102. $R_B$, $Y_B$, $M_B$ are defined previously. To decrypt the first encrypted message, first user device 102 generates a first decryption key using the $R_B$, $id_A$, $id_B$, and K2. The first decryption key, once generated is same as the symmetric key $sk_{BA}$. The first decryption key is used on the first encrypted message to extract the second public key $P_B$ and the random value $y_B$ that was used to generate the blinded public key $Y_B$. First user device 102 uses the decrypted $y_B$ and $P_B$ values to generate a blind version of the second public key. The generated blind public key is compared to the received blind public key $Y_B$ to validate the ownership of public key $P_B$ to second user device 104. In case the validation of the ownership of the public key fails, the process of establishing a communication between the first user device 102 and the second user device 104 aborts.

The first user device 102 generates a second pairwise symmetric key $sk_{AB}$ using the following formula:

$$sk_{AB}=H(\text{``}I\text{''}\|len(id_A)\|id_A\|len(id_B)\|ids\|len(R_A)\|R_A\|len(R_B)\|R_B\|len(w)\|w\|len(K2)\|K2) \quad (6)$$

First user device 102 uses the second pairwise symmetric key $sk_{AB}$ to encrypt a second message that includes the public key ($P_A$) of the first user device 102 and the random value ($y_A$) used to generate the first blind public key ($Y_A$) of the first user device 102. In some embodiments, additional values may also be encrypted in the second encrypted message along with $P_A$ and $y_A$ using the second pairwise symmetric key $sk_{AB}$. At 212, first user device 102 sends the second encrypted message to the second user device 104.

To decrypt the second encrypted message, second user device 104 generates a second decryption key using the $R_A$, $id_A$, $id_B$, and K1. The decryption key, once generated is same as the symmetric key $sk_{AB}$. The second decryption key is used on the second encrypted message to extract the first public key $P_A$ and the random value $y_A$ that was used to generate the blind public key $Y_A$. Second user device 102 uses the decrypted $y_A$ and $P_A$ values to generate a blind version of the first public key. The generated blind public key is compared to the received blind public key $Y_A$ to validate the ownership of public key $P_A$ to first user device 102. In case the validation of the ownership of the public key fails, the process of establishing a communication between the first user device 102 and the second user device 104 aborts.

Upon verifying the ownership of the first public key $P_A$ to the first user device 102, the second user device 104 uses the first symmetric key to encrypt an acknowledgement message for the first user device 102. At 214, the second user device sends the encrypted acknowledgement to the first user device 102. The first user device 102, decrypts the acknowledgement using the first decryption key $sk_{BA}$. This process provides privacy to long term public keys $P_A$ and $P_B$.

Figure 3:
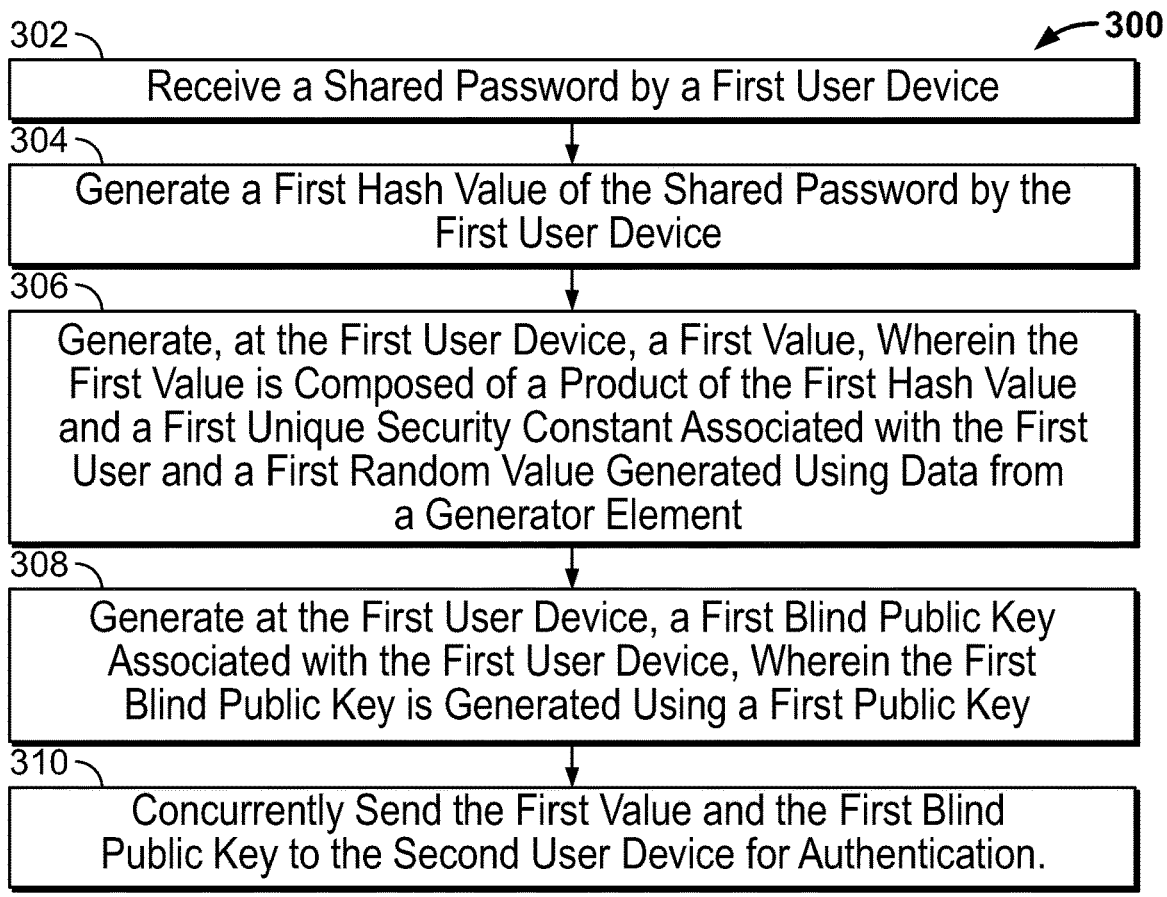
FIG. 3 shows a flow diagram for verifying an identity of a user device, in accordance with an embodiment of the present disclosure.

FIG. 3 shows a flow diagram for generating a set of values to verify an identity of the first user device 102, in accordance with an embodiment of the present disclosure. At 302, the first user device 102 receives a shared password. In some embodiments, the shared password 202 may be received from server 106. In some embodiments the shared password may be used to log into the network 108 through server 106.

At 304, the first user device 102, generates a first hash value w of the shared password 202. The hash value is generated using a hash function defined at the first user device 102.

At 306, the first user device 102 generates a first value $R_A$, wherein the first value $R_A$ is composed of at least a product of the first hash value and a first unique security constant $M_A$ associated with the first user, and a first random value $y_A$ generated using data from a generator element G. The first value $R_A$ is a way to hide the hash value of the shared password.

At 308, the first user device 102 generates a first blind public key $Y_A$ associated with the first user device 102, wherein the first blind public key $Y_A$ is generated using a first public key $P_B$. In some embodiments, the first blind public key $Y_B$ is generated by multiplying the first public key $P_B$ and a random value from a range of 0 and a product of a prime number associated with an elliptic curve and a cofactor group $y_A$.

At 310, the first user device 102 concurrently sends the first value $R_A$ and the first blind public key $Y_A$ to the second user device 104 for authentication.

Figure 4:
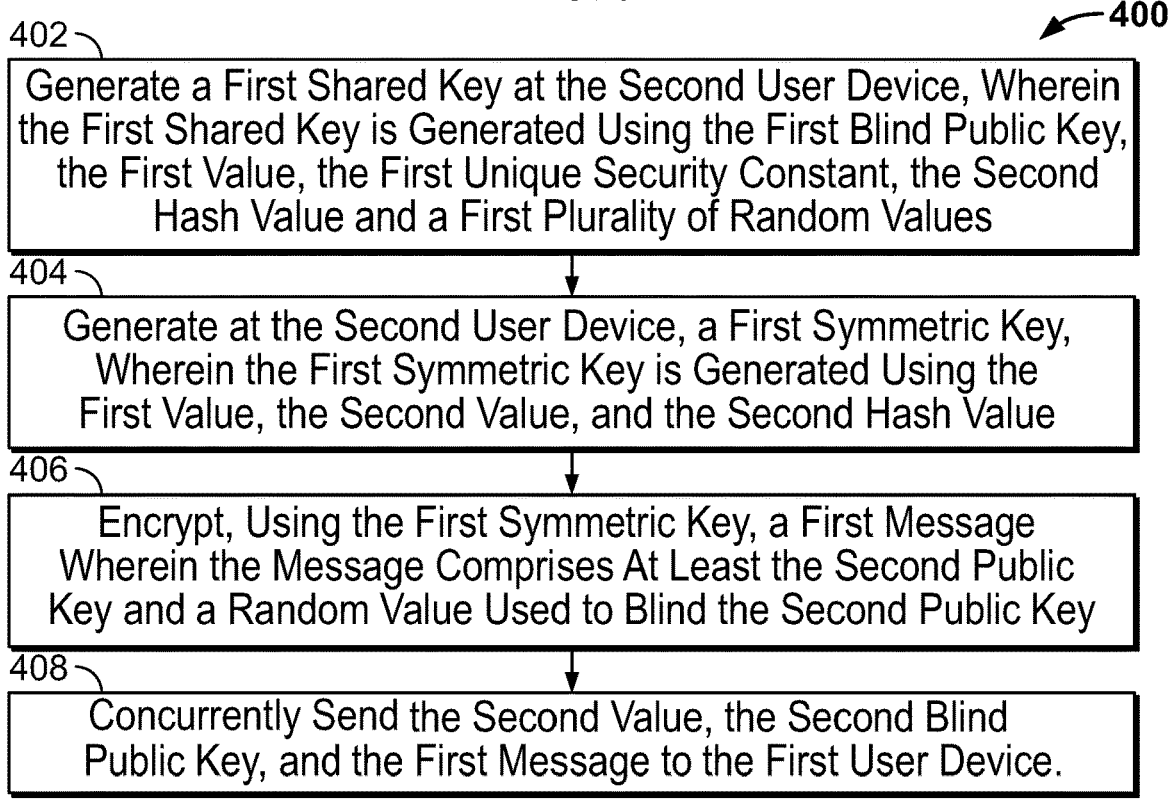
FIG. 4 shows a flow diagram for verifying an identity of a first user 102 at a second user device 104, in accordance with an embodiment of the present disclosure.

FIG. 4 shows a flow diagram for verifying an identity of a first user 102 at a second user device 104, in accordance with an embodiment of the present disclosure. At 402, the second user device 104 generates a first shared key K1 at the second user device 104, wherein the first shared key K1 is generated using the first blind public key $Y_A$, the first value $R_A$, the first unique security constant $M_A$, the second hash value w and a first plurality of random values.

At 404, the second user device 104, generates a first symmetric key $sk_{BA}$, wherein the first symmetric key $sk_{BA}$ is generated using the first value $R_A$, the second value $R_B$, and the second hash value w.

At 406, the second user device 104 encrypts a first message wherein the message comprises at least the second public key $P_B$ and a random value $y_B$ used to blind the second public key $Y_B$. In some embodiments, additional values may be encrypted in the first message along with the second public key $P_B$ and a random value $y_B$.

At 408, the second user device 104 concurrently sends the second value $R_B$, the second blind public key $Y_B$, and the first message to the first user device.

Figure 5:
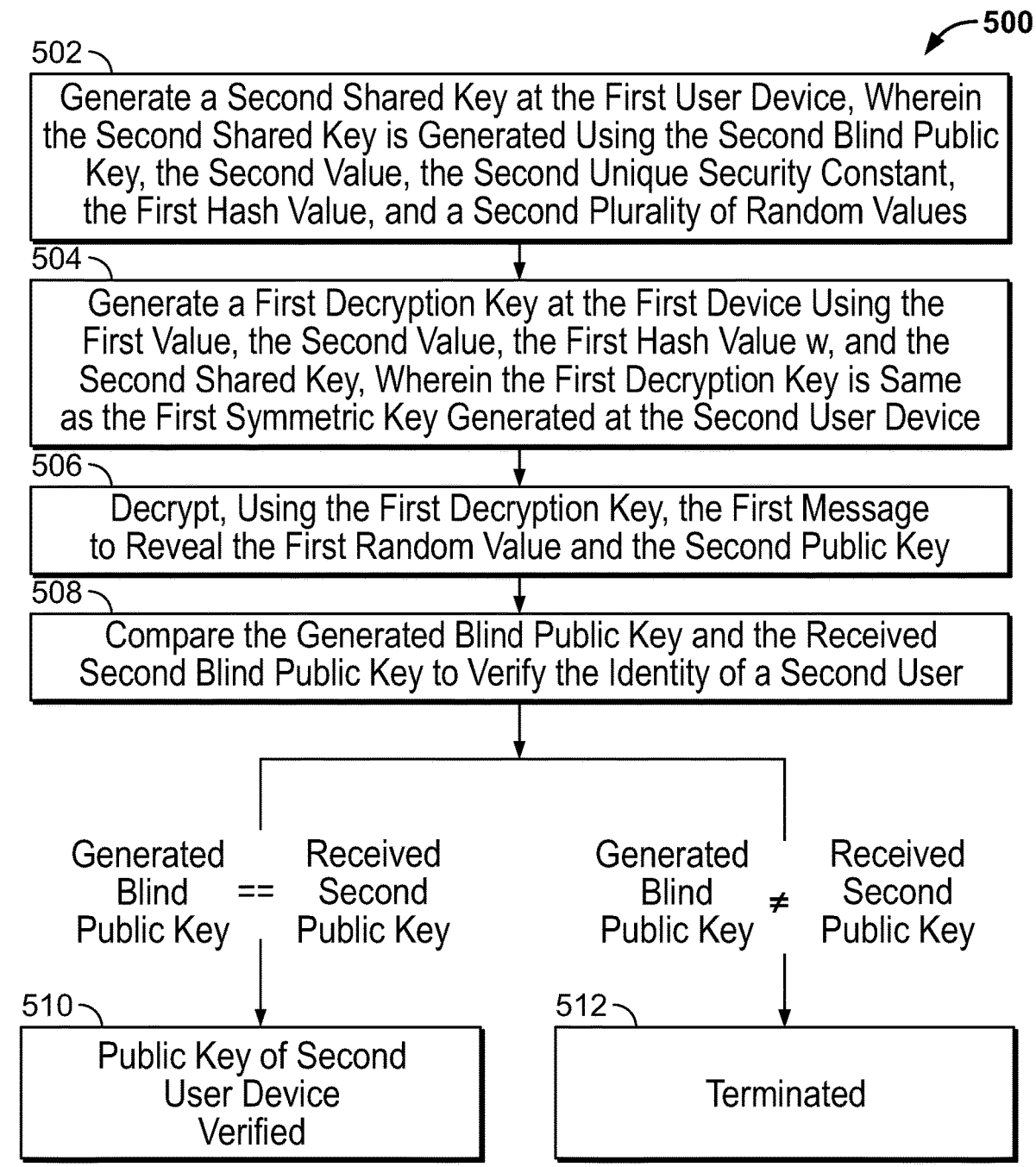
FIG. 5 shows a flow diagram for verifying an identity of a user device, in accordance with an embodiment of the present disclosure.

FIG. 5 shows a flow diagram for verifying an identity of a second user device 104 at a first user device 102, in accordance with an embodiment of the present disclosure. At 502, the first user device 102 generates a second shared key K2 at the first user device 102, wherein the second shared key is generated using the second blind public key $Y_B$, the second value $R_B$, the second unique security constant $M_B$, the first hash value w, and a second plurality of random values.

At 504, the first user device 102, generates a first decryption key at the first device using the first value $R_A$, the second value $R_B$, the first hash value w, and the second shared key K2, wherein the first decryption key is same as the first symmetric key $sk_{AB}$ generated at the second user device.

At 506, the first user device 104 decrypts, using the first decryption key, the first message to reveal the first random value $y_B$ and the second public key $P_B$.

At 508, the first user device 102 combines the first random value $y_B$ and the second public key $P_B$ to generate a blind public key $Y_B$.

At decision block 508, the first user device 102 compares the generated blind public key and the received second blind public key $Y_B$ to verify the identity of a second user. If the generated public key is same as the second blind public key, the first user device 102 is able to verify the ownership of the second public key $P_B$ associated with the second user device 104 at 510.

If the generated public key is not found to be the same as the second blind public key $P_B$, the verification process is terminated at 512.

In some embodiments, any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method for efficient password based public key authentication between a first user device and a second user device, the method comprising:
    receiving a shared password by a first user device;
    generating a first hash value of the shared password by the first user device;
    generating, at the first user device, a first value, wherein the first value is composed of at least:
        a product of the first hash value and a first unique security constant associated with the first user device; and
        a first random value generated using data from a generator element;
    generating, at the first user device, a first blind public key associated with the first user device, wherein the first blind public key is generated using a first public key; and
    concurrently sending the first value and the first blind public key to the second user device for authentication;
    receiving the first value and the first blind public key at the second user device;
    combining, at the second user device, a second random value and the first public key to generate a second blind public key; and
    comparing, at the second user device, the second blind public key and the received first blind public key to verify the identity of the first user device.

2. The method of claim 1, wherein combining, at the second user device, the second random value and the first public key to generate a second blind public key comprises:
    receiving the shared password by the second user device;
    generating a second hash value of the shared password by the second user device;
    generating, at the second user device, a second value, wherein the second value is composed of at least:
        a product of the second hash value and a second unique security constant associated with the second user device; and
        a second random value generated using data from the generator element;
    generating, at the second user device, a second blind public key associated with the second user device, wherein the second blind public key is generated using a second public key.

3. The method of claim 2, further comprising:
    generating a first shared key at the second user device, wherein the first shared key is generated using the first blind public key, the first value, the first unique security constant, the second hash value and a first plurality of random values.

4. The method of claim 3, further comprising:
    generating at the second user device, a first symmetric key, wherein the first symmetric key is generated using the first value, the second value, and the second hash value; and
    encrypting, using the first symmetric key, a first message wherein the first message comprises at least the second public key and a random value used to blind the second public key.

5. The method of claim 4, further comprising concurrently sending the second value, the second blind public key, and the first message to the first user device.

6. The method of claim 5, further comprising:
    receiving at the first user device, the second value, the second blind public key, and the first message;
    generating a second shared key at the first user device, wherein the second shared key is generated using the second blind public key, the second value, the second unique security constant, the first hash value, and a second plurality of random values; and
    generating a first decryption key at the first device using the first value, the second value, the first hash value, and the second shared key, wherein the first decryption key is same as the first symmetric key generated at the second user device.

7. The method of claim 6, further comprising:
    decrypting, at the first user device, using the first decryption key, the first message to reveal the first random value and the second public key;

combining the first random value and the second public key to generate a blind public key; and comparing the generated blind public key and the received second blind public key to verify the identity of a second user.

8. The method of claim 6, further comprising:

generating at the first user device, a second symmetric key, wherein the second symmetric key is generated using the second value, the first value, and the first hash value;

encrypting, using the second symmetric key, a second message, wherein the second message at least includes the first public key and a second random value used to blind the first public key; and sending the second message to the second user device.

9. The method of claim 8, further comprising:

generating a second decryption key at the second user device using the first value, the second value, the second hash value, and the first shared key, wherein the second decryption key is same as the second symmetric key generated at the first user device; and decrypting, using the second decryption key, the second message to reveal the second random value and the first public key.

10. The method of claim 9, wherein the second user device sends an acknowledgement to the first user device, wherein the acknowledgement includes the second shared key.

11. A system for efficient password based public key authentication between a first user device and a second user device, the system comprising:

a first device having first control circuitry configured to:
receive a shared password by a first user device;
generate a first hash value of the shared password by the first user device;
generate a first value, wherein the first value is composed of at least:
a product of the first hash value and a first unique security constant associated with the first user device; and
a first random value generated using data from a generator element;
generate a first blind public key associated with the first user device, wherein the first blind public key is generated using a first public key; and
concurrently send the first value and the first blind public key to the second user device for authentication; and a second device having second control circuitry configured to:
receive the first value and the first blind public key;
combine a second random value and the first public key to generate a second blind public key; and
compare the second blind public key and the received first blind public key to verify the identity of the first user device.

12. The system of claim 11, wherein the second control circuitry configured to combine the second random value and the first public key to generate a second blind public key is further configured to:
receive the shared password by the second user device;
generate a second hash value of the shared password by the second user device;
generate, at the second user device, a second value, wherein the second value is composed of at least:
a product of the second hash value and a second unique security constant associated with the second user device; and
a second random value generated using data from the generator element;
generate, at the second user device, a second blind public key associated with the second user device, wherein the second blind public key is generated using a second public key.

13. The system of claim 12, wherein the second control circuitry is further configured to:
generate a first shared key at the second user device, and wherein the first shared key is generated using the first blind public key, the first value, the first unique security constant, the second hash value and a first plurality of random values.

14. The system of claim 13, wherein the second control circuitry is further configured to:
generate at the second user device, a first symmetric key, wherein the first symmetric key is generated using the first value, the second value, and the second hash value; and
encrypt, using the first symmetric key, a first message wherein the first message comprises at least the second public key and a random value used to blind the second public key.

15. The system of claim 14, wherein the second control circuitry is further configured to concurrently send the second value, the second blind public key, and the first message to the first user device.

16. The system of claim 15, wherein the first control circuitry is further configured to:
receive, at the first user device, the second value, the second blind public key, the, and the first message;
generate a second shared key at the first user device, wherein the second shared key is generated using the second blind public key, the second value, the second unique security constant, the first hash value, and a second plurality of random values; and
generate a first decryption key at the first device using the first value, the second value, the first hash value, and the second shared key, wherein the first decryption key is same as the first symmetric key generated at the second user device.

17. The system of claim 16, wherein the first control circuitry is further configured to:
decrypt, at the first user device, using the first decryption key, the first message to reveal the first random value and the second public key;
combine the first random value and the second public key to generate a blind public key; and
compare the generated blind public key and the received second blind public key to verify the identity of a second user.

18. The system of claim 16, wherein the first control circuitry is further configured to:
generate at the first user device, a second symmetric key, wherein the second symmetric key is generated using the second value, the first value, and the first hash value;
encrypt, using the second symmetric key, a second message, wherein the second message at least includes the first public key and a second random value used to blind the first public key; and
send the second message to the second user device.

19. The system of claim 18, wherein the second control circuitry is further configured to:

generate a second decryption key at the second user device using the first value, the second value, the second hash value, and the first shared key, wherein the second decryption key is same as the second symmetric key generated at the first user device;

decrypt, using the second decryption key, the second message to reveal the second random value and the first public key;

combine the second random value and the first public key to generate a blind public key; and compare the generated blind public key and the received first blind public key to verify the identity of the first user device.

20. The system of claim 19, wherein the second control circuitry is further configured to send an acknowledgement to the first user device, wherein the acknowledgement includes the second shared key.

* * * * *